United States Patent
Muhamad

(10) Patent No.: US 8,579,516 B2
(45) Date of Patent: Nov. 12, 2013

(54) ROLLER CAGE FOR A ROLLING BEARING, PARTICULARLY A DOUBLE ROLLER CAGE FOR A CYLINDER ROLLING BEARING, ROLLING BEARING, AND METHOD FOR PRODUCING A ROLLER CAGE FOR A ROLLING BEARING

(75) Inventor: Ibrahim Muhamad, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 265 days.

(21) Appl. No.: 13/130,859

(22) PCT Filed: Nov. 25, 2009

(86) PCT No.: PCT/DE2009/001672
§ 371 (c)(1),
(2), (4) Date: May 24, 2011

(87) PCT Pub. No.: WO2010/063258
PCT Pub. Date: Jun. 10, 2010

(65) Prior Publication Data
US 2011/0229066 A1    Sep. 22, 2011

(30) Foreign Application Priority Data
Dec. 3, 2008  (DE) .......................... 10 2008 060 320

(51) Int. Cl.
*F16C 33/49* (2006.01)
*B21D 53/12* (2006.01)

(52) U.S. Cl.
USPC ....................... 384/577; 384/580; 29/898.067

(58) Field of Classification Search
USPC .............. 384/572, 577, 580, 470; 29/898.067
See application file for complete search history.

(56) References Cited

U.S. PATENT DOCUMENTS

| 2,611,670 A | 9/1952 | Palmgren | |
|---|---|---|---|
| 3,290,102 A * | 12/1966 | Eriksson et al. | 384/577 |
| 3,720,450 A * | 3/1973 | Dominik | 384/572 |

FOREIGN PATENT DOCUMENTS

| DE | 200 20 397 U1 | 2/2001 |
|---|---|---|
| DE | 10 2004 043374 A1 | 3/2006 |
| EP | 1 816 362 A1 | 8/2007 |
| WO | 2005 019666 A2 | 3/2005 |

\* cited by examiner

*Primary Examiner* — Thomas R Hannon
(74) *Attorney, Agent, or Firm* — Lucas & Mercanti, LLP

(57) ABSTRACT

A roller cage for a rolling bearing, particularly a double roller cage for a cylinder rolling bearing, which has a ring web with axially extending webs. Every two adjacent webs delimit a receptacle pocket for a rolling element with a floor thereof being formed by the ring web. Each web has a radial outer and inner base side connected to each other by an axial outer face side. The face side of the radial outer base side is tapered toward the radial inner base side. To increase the rigidity of the webs with regard to trouble-free removal and installation of the rolling bearing, the radial inner base side is trapezoidal such that a web width of the radial inner base side increases from the face side to the floor of the receptacle pocket.

17 Claims, 3 Drawing Sheets ature) to an axial roller length of the associated rolling body. In other words, the rolling body is supported practically over its entire length by the radially inner base side of the web. This results in satisfactory guidance of the rolling body and a satisfactory support action of the web.

ROLLER CAGE FOR A ROLLING BEARING, PARTICULARLY A DOUBLE ROLLER CAGE FOR A CYLINDER ROLLING BEARING, ROLLING BEARING, AND METHOD FOR PRODUCING A ROLLER CAGE FOR A ROLLING BEARING

This application is a 371 of PCT/DE2009/001672 filed Nov. 25, 2009, which in turn claims the priority of DE 10 2008 060 320.1 filed Dec. 3, 2008, the priority of both applications is hereby claimed and both applications are incorporated by reference herein.

FIELD OF THE INVENTION

The invention relates to a roller cage for a rolling bearing, particularly a double roller cage for a cylinder rolling bearing. Furthermore, the invention relates to a rolling hearing having a roller cage of this type and to a method for producing a roller cage of this type.

BACKGROUND OF THE INVENTION

Rolling bearings having a roller cage, such as double row cylinder rolling bearings, are used as a rule in machine tools, rolling stands or else large gear mechanisms. Double row cylinder rolling bearings comprise a double roller cage with an annular web from which webs which are offset with respect to one another protrude axially on both sides. Receiving pockets are formed between the webs, in which receiving pockets the cylindrical rollers are held. Bearings of this type are not self-retaining as a rule, that is to say all the bearing parts cannot be readily installed and dismantled separately because the rolling bodies would fall out. As a result, the mounting of the bearing, its maintenance and also examination are made more difficult. It is also disadvantageous that the web cross section is of relatively small configuration and a web can break off easily during operation of the bearing.

OBJECT OF THE INVENTION

The invention is based on the object of making dismantling and assembly which is as free of disruptions as possible and disruption-free operation of a rolling hearing possible, without a filling notch being integrated in one of the bearing rings.

SUMMARY OF THE INVENTION

According to the invention, the object is achieved by a roller cage for a rolling bearing, particularly a double roller cage for a cylinder rolling bearing, comprising an annular web with axially extending webs, in each case two adjacent webs delimiting a receiving pocket for a rolling body, the bottom of which receiving pocket is formed by the annular web, each web having a radially outer base side and a radially inner base side which are connected to one another via an axially outer end side, the end side being tapered from the radially outer base side in the direction of the radially inner base side, and the radially inner base side being of trapezoidal configuration in such a way that a web width of the radially inner base side increases from the end side to the bottom of the receiving pocket.

"Trapezoidal" is generally understood as meaning an, in particular, uniform increase in the web width toward the bottom.

In contrast to a conventional double roller cage of a cylinder rolling bearing, the radially inner base side of the webs does not have a constant width in the proposed refinement, but rather its width increases in the direction of the bottom of the receiving pocket and is at its widest at the bottom of the web, that is to say at the location where the risk of fracture is at its greatest. As a result, there is also a satisfactory fit of the rolling body in the rear region of the receiving pocket in the region of the bottom. In addition, the tip of the web is of narrower configuration in the region of the end side and the receiving pocket is particularly wide in the region of the end sides of the webs, with the result that a rolling body can be introduced axially into the receiving pocket, without a filling notch being required in that one of the bearing rings.

One substantial advantage of this refinement of the roller cage is to be seen in the fact that the risk of fracture is reduced considerably on account of the reduced material removal during the formation of the webs which have a thickened base, with the result that dismantling and assembly and operation of the rolling bearing is ensured in a manner which is as free of disruptions as possible. In addition, the guidance of the rolling bodies was improved thanks to the increased enclosure on account of the shape of the webs. The linear rolling body/web contact is always maintained, that is to say the rolling body makes contact with the web over the entire web length.

With regard to particularly satisfactory guidance of the rolling bodies in the receiving pocket, the webs have side faces which face the receiving pockets, a projecting edge being provided axially along the side faces for snapping the rolling body in the receiving pocket. Thanks to the projecting edges, the rolling body is held captively in the roller cage and cannot fall out without the action of an external force. As a result, the mounting and maintenance are simplified.

Satisfactory adaptation of the geometry of the receiving pocket to the geometry of the rolling body takes place by preferably each side face being divided by the projecting edge into a radially outer and a radially inner side face region and at least one of the side face regions being of concave configuration. This means that each side face has two arcuate side face regions which are divided by the projecting edge. The side face regions have, in particular, a different curvature radius and/or are at a different angle with respect to the web. In the mounted state, the rolling body is therefore engaged behind captively by the edge.

The edge preferably lies in a radially central region of the side face under the rolling circle. In particular, the edge is positioned and oriented in such a way that it extends virtually parallel to a center axis of the rolling body when it is plugged in the receiving pocket, and therefore supports the rolling body along its length, without the mounting of a bearing ring which can be dismantled being risked.

According to one preferred variant, the height of the edge increases, in particular uniformly, in relation to the side face as the distance from the bottom of the receiving pocket increases. As a result, in particular, the decrease of the web width in the direction of the end side is compensated for, with the result that the edge can engage reliably into the rolling body, even in the region of the tip of the web, and produces a snap action.

The radially outer base side of the web expediently has a constant web width in the axial direction. The radially outer base side of the webs therefore has a rectangular shape and its axially extending edges enclose a right angle with the bottom of the receiving pockets.

In order to achieve a great rigidity of the webs, the web width on the radially inner base side of the web preferably corresponds in the region of the bottom of the receiving pocket approximately (that is to say within a few tenths of a mm) to the web width on the radially outer base side. Here, the web widths on the radially inner and the radially outer base sides in the lowermost region of the web is approximately equal, with the result that a stable foundation is formed for the web. In contrast with the radially outer base side, the radially inner base side encloses an obtuse angle with the bottom on account of its trapezoidal shape.

An outer circumferential side of the annular web is preferably wider than an inner circumferential side, with the result that at least one part of the bottom of the receiving pocket is of inclined configuration. An upper bottom region of the bottom, which bottom region bears against the outer circumferential side, preferably extends perpendicularly with respect to a radial direction. The bottom of the receiving pocket, which bottom extends between the outer circumferential side and the inner circumferential side, is therefore oblique apart from the small bottom region which is parallel to the rolling body and on which the cage is held axially in position by the rolling body, with the result that a satisfactory passage of a lubricant to the rolling bodies is made possible.

Furthermore, the feed of the lubricant is facilitated by lubricating grooves for the lubricant preferably being provided on the annular web. The lubricating grooves extend, in particular, both on the outer and on the inner circumferential side and are connected to one another by holes in the annular web, it being possible, depending on the application, for the outer lubricating groove for generating hydrodynamic lubrication to be omitted.

Furthermore, the object is achieved according to the invention by a rolling bearing, particularly a cylinder rolling hearing, comprising a double roller cage of this type which is arranged between an inner ring and an outer ring. Here, the inner ring and the outer ring are preferably free of filling notches, that is to say a filling notch for introducing the rolling bodies is not formed either in the inner ring or the outer ring, but rather the rolling body is introduced axially into the receiving pocket on account of the shape of said receiving pocket.

Moreover, the object is achieved according to the invention by a method for producing a roller cage for a rolling bearing, particularly a double roller cage for a cylinder rolling hearing, the roller cage comprising an annular web with axially extending webs, in each case two adjacent webs delimiting a receiving pocket for a rolling body, the bottom of which receiving pocket is formed by the annular web, in which method:
- an outer part region of the receiving pocket is formed in a first machining step in the axial direction, and
- an inner part region of the receiving pocket is formed in a second machining step in an inclined manner with respect to the axial direction, in such a way that a web width of the inner part region increases in the direction of the bottom of the receiving pocket.

The advantages which have already been specified in relation to the roller cage and preferred refinements can be transferred analogously to the rolling body and to the method.

During the production of the roller cage, first of all a removal of material with the formation of chips is carried out preferably by milling in the axial direction in the region of the outer circumferential side of the annular web, as a result of which the radially outer part region of the receiving pocket is produced. Here, the milling tool is advanced parallel to the axial direction and therefore perpendicularly with respect to the annular web as far as an axial depth, at which the bottom is formed. Depending on the size of the annular web or the cage size, the milling tool is subsequently inclined by a defined angle with regard to the axial direction, and the inner part region of the receiving pocket is milled out. Here, the advancing movement of the milling tool takes place obliquely with respect to the axial direction, in such a way that the web depth increases toward the bottom. The milling in the inner part region of the webs in the second step takes place more deeply than in the outer part region, as a result of which the projecting edge is produced, the height of which decreases with the web length toward the bottom. The bottom of the receiving pocket is formed partly as an oblique plane as a result of the inclined milling.

BRIEF DESCRIPTION OF THE DRAWING

One exemplary embodiment of the invention will be explained in greater detail using a drawing, in which, diagrammatically.

DETAILED DESCRIPTION OF THE DRAWING

Figure 1:
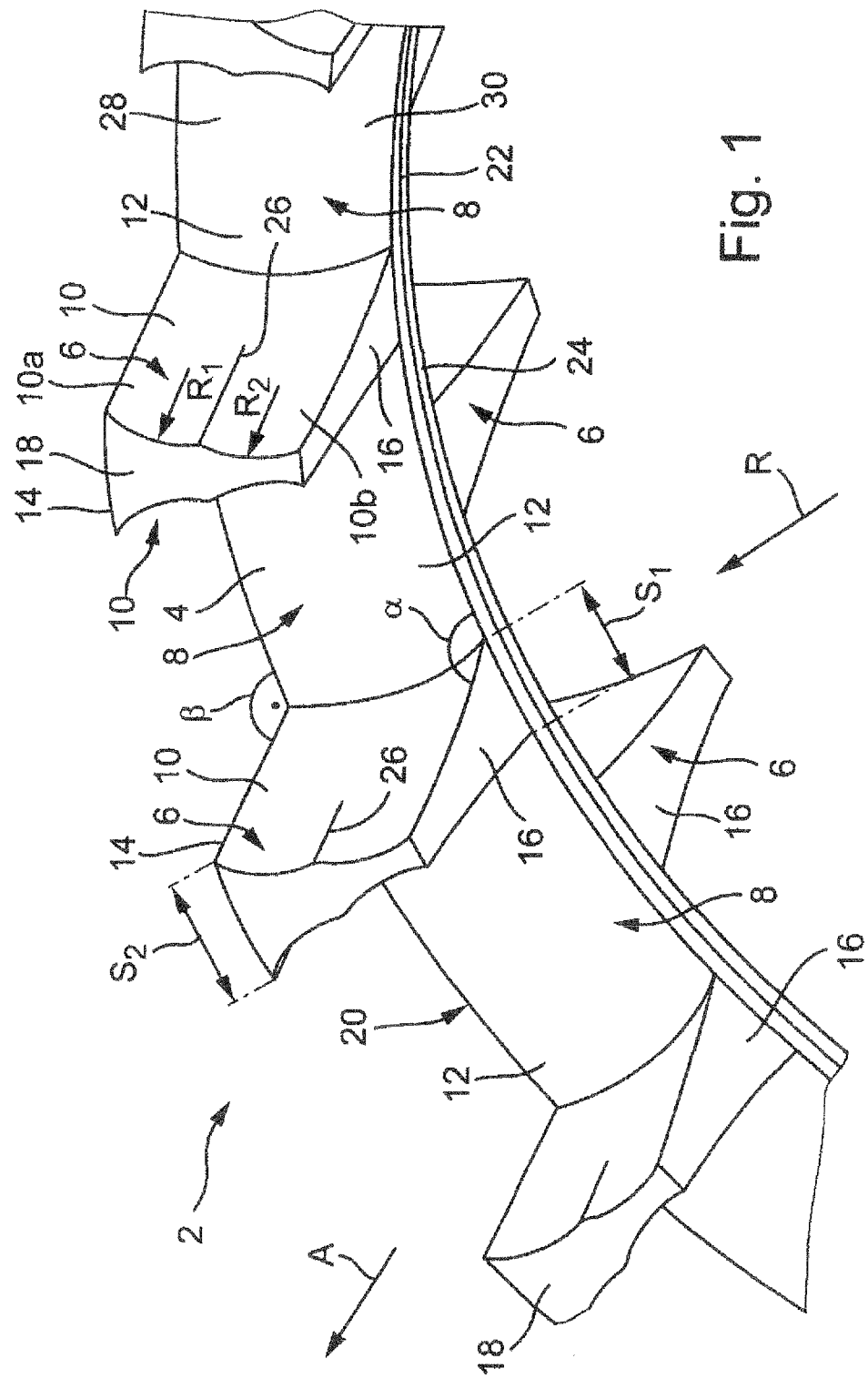
FIG. 1 shows a perspective illustration of a partial section of a double roller cage.
Figure 2:
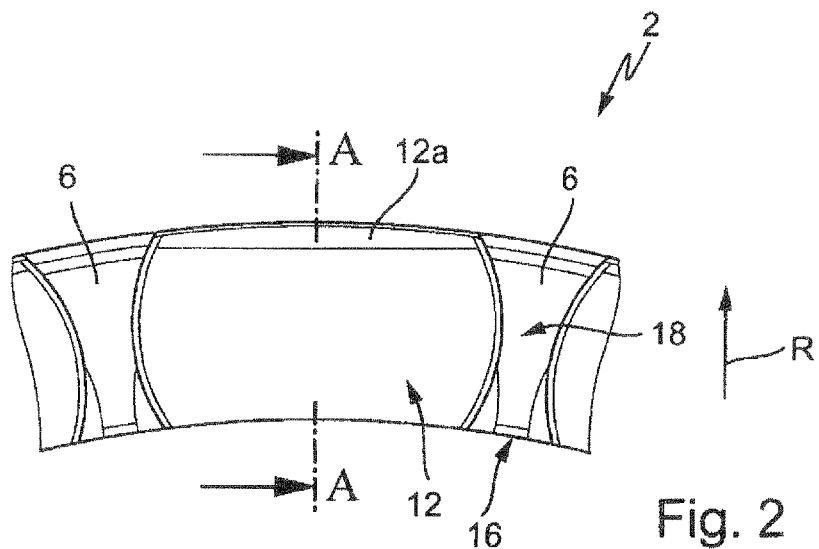
FIG. 2 shows a front view in the axial direction of a partial section of the double roller cage according to FIG. 1.
Figure 3:
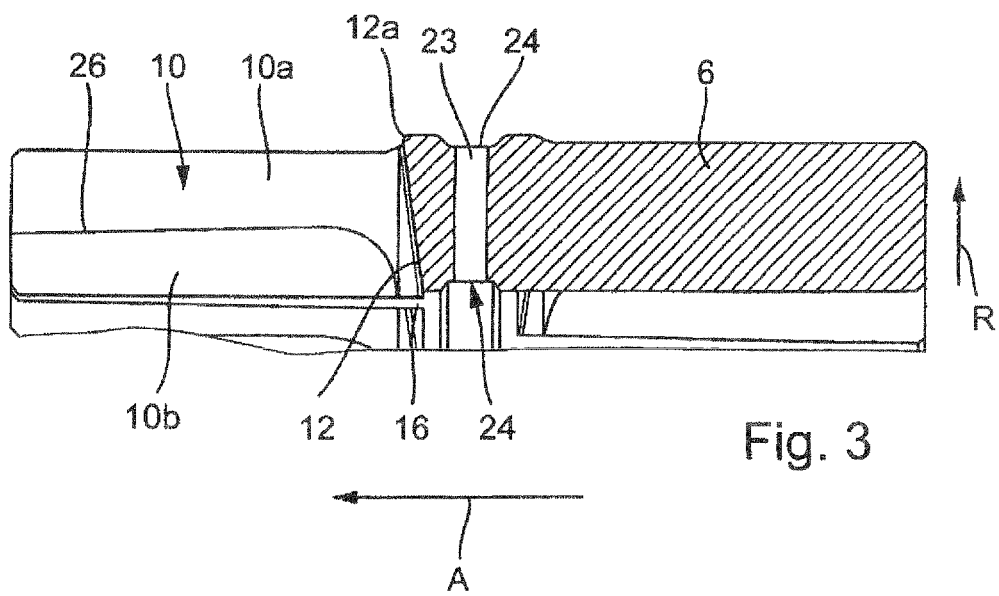
FIG. 3 shows a section through the plane AA according to FIG. 2.
Figure 4:
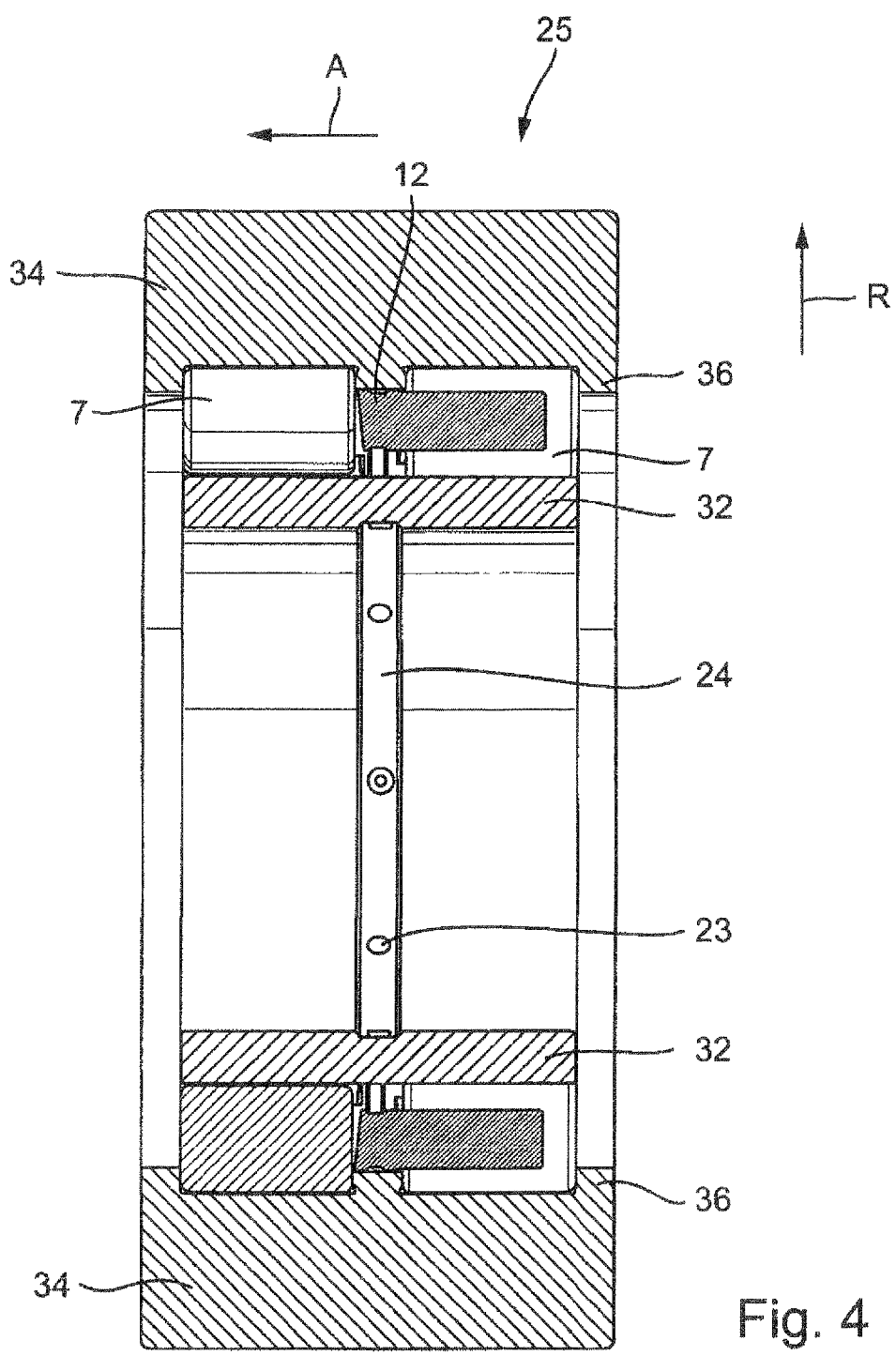
FIG. 4 shows an axial section through a cylinder rolling bearing having a double roller cage according to FIG. 1.

The double roller cage 2 according to FIGS. 1 to 3 comprises a central annular web 4, from which a plurality of webs 6 protrude on both sides in the axial direction A which are formed offset with respect to one another. A U-shaped receiving pocket 8 for a rolling body 7 in the manner of a cylindrical roller (see FIG. 4) is formed between in each case two adjacent webs 6. The lateral delimitation of the receiving pocket 8 is defined by two side faces 10 of two adjacent webs 6 and a bottom 12 of the receiving pocket 8 is formed by the annular web 4. Moreover, the webs 6 in each case have a radially outer base side 14 and a radially inner base side 16. The base sides 14, 16 and the side faces 10 are connected to one another via an axially outer end side 18.

The annular web 4 has an outer circumferential side 20 and an inner circumferential side 22, the inner circumferential side 22 being narrower, with the result that the bottom 12 of the receiving pockets 8 is inclined with respect to the radial direction R apart from a narrow bottom region 12a (see FIG. 1). The bottom region 12a adjoins the outer circumferential side 20 and extends parallel to the radial direction R. Lubricating grooves 24 for a lubricant which are connected to one another via lubricating holes 23 are provided on the circumferential sides 20, 22.

A risk of fracture during installation or dismantling and operation of the bearing and captive holding of the rolling bodies 7 are achieved by the special design of the webs 6. In order to improve their rigidity, the webs 6 have a width which increases toward the bottom 12, the widest point being situated in the region of the bottom 12 and having a web width $S_1$. The uniform thickening of the web 6 can be seen particularly well using the trapezoidal shape of the radially inner base side 16 which encloses an angle α of >90° with the bottom 12.

In contrast to this, the radially outer base side 14 has a constant width $S_2$. It is the case here that the web width $S_1$ of the radially inner base side 16 corresponds at the widest point to the web width $S_2$ of the radially outer base side 14. On account of its constant width $S_2$, the radially outer base side 14 has the shape of a rectangle and encloses a right angle β with the bottom 12 of the receiving pocket 8.

The secure holding of the rolling bodies 7 takes place by means of a projecting edge 26 which extends in a radially central region of the side faces 10 of the webs 6 and performs a snap function during the introduction of the rolling body 7 into the receiving pocket 8. The edge 26 is oriented in such a way that, in the installed state of the bearing 25 (see FIG. 2), it extends parallel to the center axis of the rolling body 7 which is inserted in the receiving pocket. Here, the height of the edge 26 increases linearly as the distance increases from the bottom 12 of the receiving pocket 8.

The edge 26 divides the side face 10 into an outer side face region 10a and an inner side face region 10b; as can he seen from FIG. 3, the inner side face region 10b does not reach as far as the bottom 12. The outer side face region 10a has a curvature radius $R_1$ which differs from the curvature radius $R_2$ of the inner side face region 10b. Here, the curvature radius $R_1$ is greater than $R_2$, in order to ensure guidance of the rolling body on the rolling circle.

The webs 6 and the receiving pockets 8 are shaped in two production steps. In the first step, a milling tool is moved axially and an outer part region 28 is milled out, laterally delimited by the outer side face regions 10a of two webs 6. Subsequently, the milling tool is inserted inclined by a predefined angle with respect to the axial direction, an inner part region 30 of the receiving pocket 8 being formed. Here, the edge 26 is produced at the boundary of the two part regions 28, 30. The inclined bottom 12 is likewise formed with the inclined milling tool during the second milling operation.

The double roller cage 2 is provided, in particular, for a cylinder rolling bearing 25 and, in the installed state of the cylinder rolling bearing 25, is arranged between an inner ring 32 and an outer ring 34 with lateral rims 36. On account of the design of the webs 6, the tips of which are thinner than the root in the region of the bottom 12, the rolling body 7 can be plugged in axially past the rim 36, said rolling body 7 being snapped in by the edges 26. Thanks to the snap function of the edges 26, the rolling body 7 cannot fall out, even if it cannot be supported on the inner ring 32 during the mounting or dismantling of the bearing 25.

In the described embodiment, the rims 36 are arranged on the outer ring 34. The cage concept can likewise be transferred to the bearing which has a rimless outer ring 34 and an inner ring 32 which is configured with rims 36. In this case, the annular web 4 is narrower in the radially outer direction R. Here, the perpendicular bottom region 12a is arranged radially on the inside.

The use of this concept can likewise occur in a cage which is guided by rolling bodies. In this case, a decision has to be made as a function of the hearing dimensions as to whether the bottom region 12a is to lie radially on the inside or outside.

The proposed concept for configuring the cage can also be used in combination with a filling notch. One decisive advantage here is that the filling notch can be of substantially smaller configuration than in a conventional hearing, and the running of the bearing is improved substantially as a result.

LIST OF DESIGNATIONS

2 Roller Cage
4 Annular Web
6 Web
7 Rolling Bodies
8 Receiving Pocket
10 Side Face
10a Outer Side Face Region
10b Inner Side Face Region
12 Bottom
12a Bottom Region
14 Radially Outer Base Side
16 Radially Inner base side
18 End Side
20 Outer Circumferential Side
22 Inner Circumferential Side
23 Lubricating Hole
24 Lubricating Groove
25 Cylinder Rolling Bearing
26 Edge
28 Outer Part Region of the Receiving Pocket
30 Inner Part Region of the Receiving Pocket
32 Inner Ring
34 Outer Ring
36 Rim
A Axial Direction
AA Section Plane
R Radial Direction
$R_1, R_2$ Curvature Radius
$S_1$ Web Width of the Radially Inner Base Side
$S_2$ Web Width of the Radially Outer Base Side
α Angle
β Angle

The invention claimed is:

1. A roller cage, comprising:
an annular web having axially extending webs delimiting receiving pockets for rolling bodies,
the receiving pockets each having a bottom formed by the annular web,
each of the axially extending webs have a radially outer base side, a radially inner base side and an axially outer end side, the outer base side and the inner base side are connected to one another via the end side,
the end side is tapered radially from the outer base side toward the inner base side,
the inner base side has trapezoidal configuration such that a web width of the inner base side increases from the end side toward the bottom of the receiving pockets, and
the webs have side faces directed toward the receiving pockets, and the side faces each have a projecting edge which extends axially along the side faces for snapping the rolling bodies in the receiving pockets.

2. The roller cage as claimed in claim 1, wherein the roller cage is a double roller cage and the rolling bodies are cylinder roiling bearings.

3. The roller cage as claimed in claim 1, wherein the side faces are divided by the projecting edge into a radially outer side face region and a radially inner side face region and at least one of the side face regions is concave.

4. The roller cage as claimed in claim 3, wherein the projecting edges are located in a radially central region of the side faces.

5. The roller cage as claimed in claim 4, wherein a height of the projecting edges increases in relation to the side faces as a distance from the bottom of the receiving pocket increases.

6. The roller cage as claimed in claim 1, wherein the outer base side of the web has a constant web width in an axial direction.

7. The roller cage as claimed in claim 1, wherein the web width of the inner base side of each of the axially extending webs corresponds in a region of the bottom of the receiving pocket approximately to a web width on the outer base side of each of the axially extending webs.

8. The roller cage as claimed in claim 1, wherein the annular web has an outer circumferential side and an inner circumferential side and the outer circumferential side is wider than an inner circumferential side such that at least one part of the bottom of the receiving pockets is inclined.

9. The roller cage as claimed in claim 8, wherein the bottom has an upper bottom region, which bears against the outer circumferential side, extending perpendicularly with respect to a radial direction.

10. The roller cage as claimed in one claim 1, wherein the annular web has lubricating grooves for a lubricant.

11. A rolling bearing, comprising:
an inner ring;
an outer ring; and
a roller cage comprising an annular web having axially extending webs delimiting receiving pockets for rolling bodies, the receiving pockets each having a bottom formed by the annular web, each axially extending web has a radially outer base side, a radially inner base side and an axially outer end side, the outer base side and the inner base side are connected to one another via the end side, the end side is tapered radially from the outer base side toward the inner base side, the inner base side has trapezoidal configuration such that a web width of the inner base side increases from the end side toward the bottom of the receiving pockets, and the webs have side faces directed toward the receiving pocket, the side faces each have a projecting edge which extends axially along the side faces for snapping the rolling bodies in the receiving pockets,
wherein the roller cage is arranged between the inner ring and the outer ring.

12. The rolling bearing as claimed in claim 11, wherein the rolling bearing is a cylindrical rolling bearing.

13. The rolling bearing as claimed in claim 11, wherein the inner ring and the outer ring are free of filling notches.

14. A roller cage, comprising:
an annular web having axially extending webs delimiting receiving pockets for rolling bodies,
the receiving pockets each having a bottom formed by the annular web,
each of the axially extending webs have a radially outer base side, a radially inner base side and an axially outer end side, the outer base side and the inner base side are connected to one another via the end side,
the end side is tapered radially from the outer base side toward the inner base side,
the inner base side has trapezoidal configuration such that a web width of the inner base side increases from the end side toward the bottom of the receiving pockets,
wherein the annular web has an outer circumferential side and an inner circumferential side and the outer circumferential side is wider than an inner circumferential side such that at least one part of the bottom of the receiving pockets is inclined, and
wherein the bottom has an upper bottom region, which bears against the outer circumferential side, extending perpendicularly with respect to a radial direction.

15. A roller cage, comprising:
an annular web having axially extending webs delimiting receiving pockets for rolling bodies,
the receiving pockets each having a bottom formed by the annular web,
each of the axially extending webs have a radially outer base side, a radially inner base side and an axially outer end side, the outer base side and the inner base side are connected to one another via the end side,
the end side is tapered radially from the outer base side toward the inner base side,
the inner base side has trapezoidal configuration such that a web width of the inner base side increases from the end side toward the bottom of the receiving pockets, and
wherein the annular web has lubricating grooves for a lubricant.

16. A method for producing a roller cage for a rolling bearing comprising an annular web having axially extending webs delimiting receiving pockets for rolling bodies and a bottom is formed by the annular web, the method comprising the steps of:
forming an outer part region of the receiving pockets in a first machining step in an axial direction; and
forming an inner part region of the receiving pockets in a second machining step in an inclined manner with respect to the axial direction, in such a way that a web width of the inner part region increases in a direction of the bottom of the receiving pockets.

17. The rolling bearing as claimed in claim 16, wherein the roller cage is a double roller cage and the rolling bearing is a cylinder rolling bearing.

\* \* \* \* \*